Figure 1:
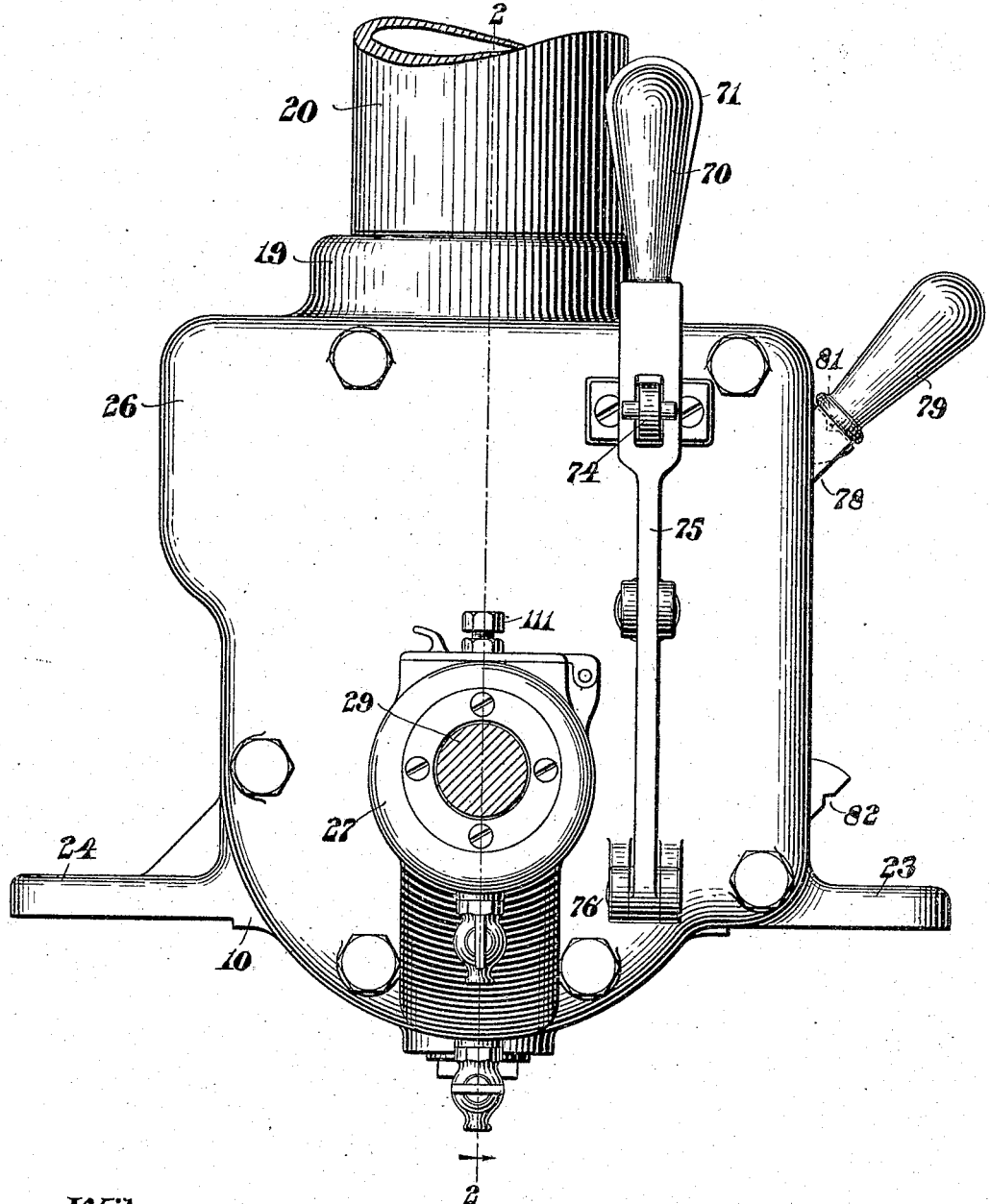

J. R. KINNEY.
ROTARY MOTOR AND PUMP.
APPLICATION FILED NOV. 5, 1907.

942,080.

Patented Dec. 7, 1909.
6 SHEETS—SHEET 1.

Witnesses:
Nathan C. Lombard
Howard Hanscom

Inventor:
Justus R. Kinney,
by Walter E. Lombard,
Atty.

J. R. KINNEY.
ROTARY MOTOR AND PUMP.
APPLICATION FILED NOV. 5, 1907.

942,080.

Patented Dec. 7, 1909.
6 SHEETS—SHEET 2.

Witnesses:
Nathan C. Lombard
Howard Hanscom

Inventor:
Justus R. Kinney,
by Walter E. Lombard,
Atty.

J. R. KINNEY.
ROTARY MOTOR AND PUMP.
APPLICATION FILED NOV. 5, 1907.
942,080.
Patented Dec. 7, 1909.
6 SHEETS—SHEET 3.
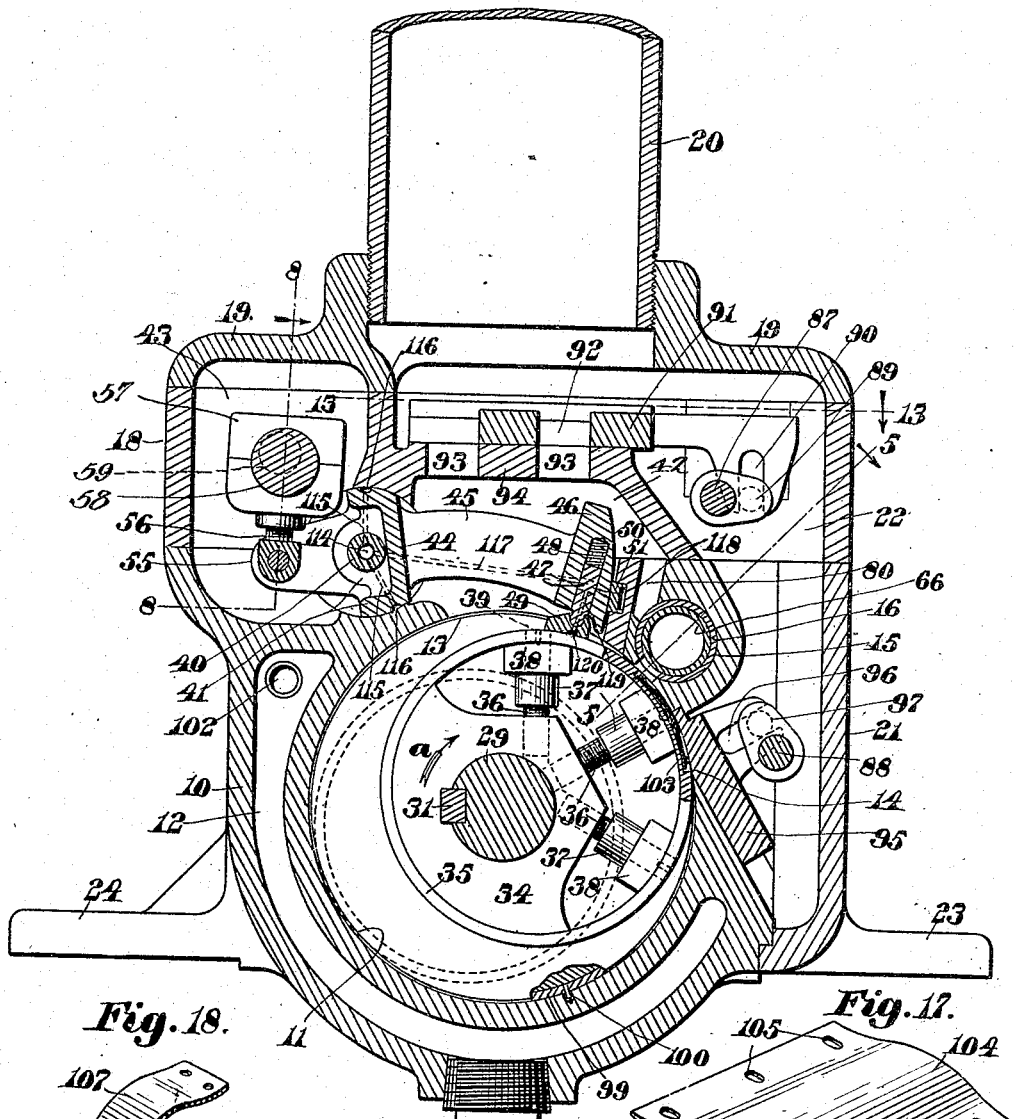

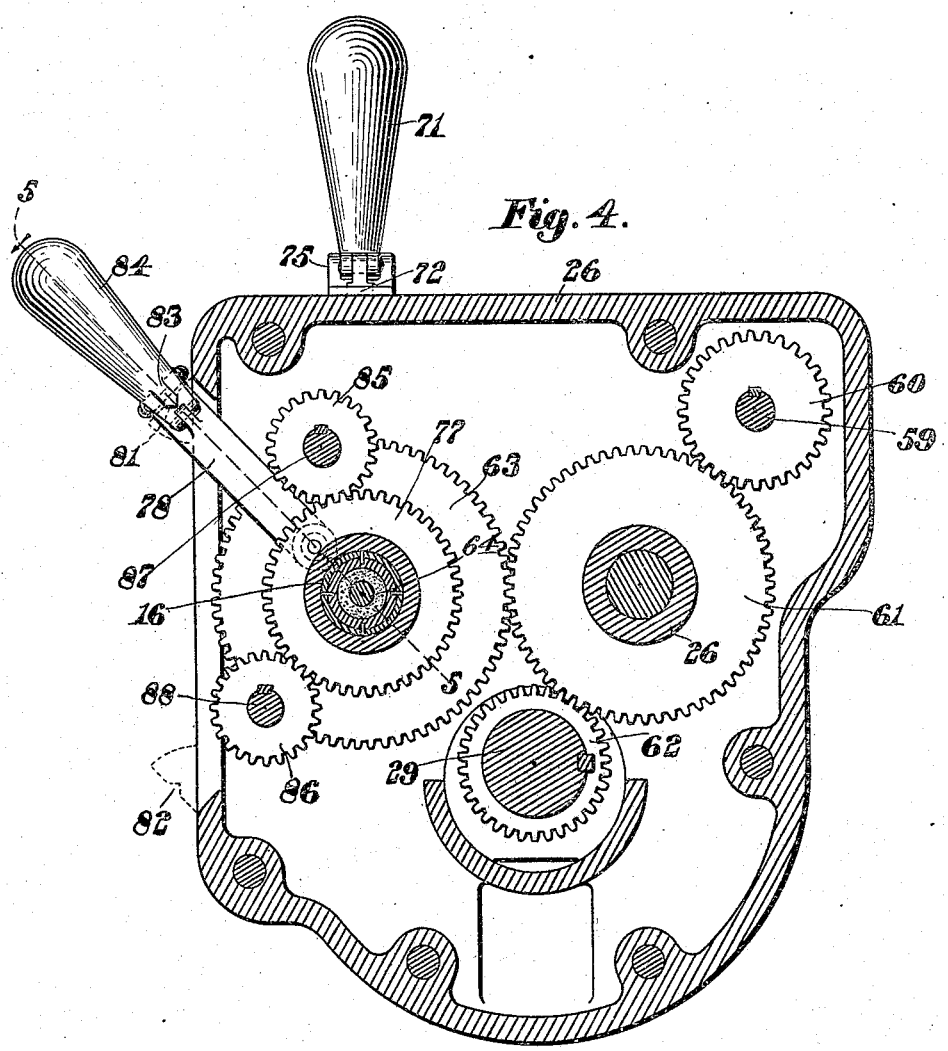

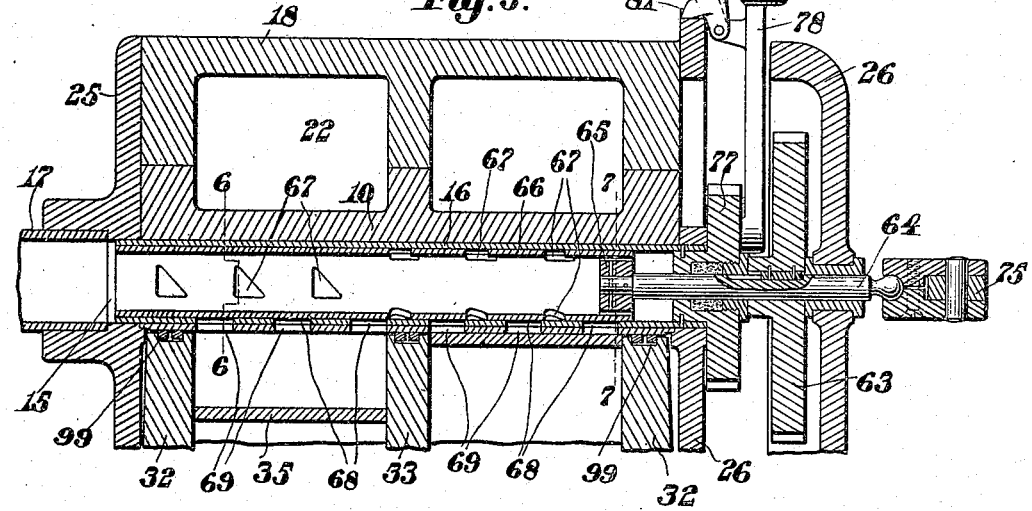

J. R. KINNEY.
ROTARY MOTOR AND PUMP.
APPLICATION FILED NOV. 5, 1907.
942,080.
Patented Dec. 7, 1909.
6 SHEETS—SHEET 6.
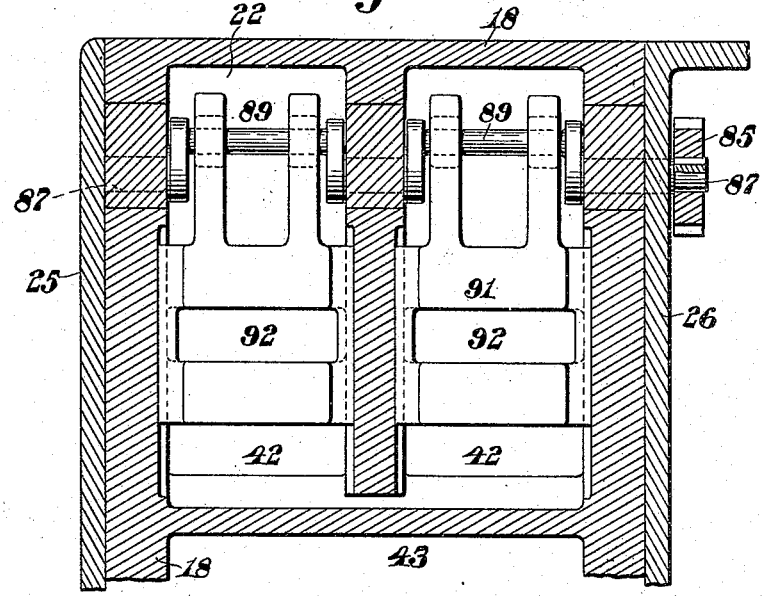
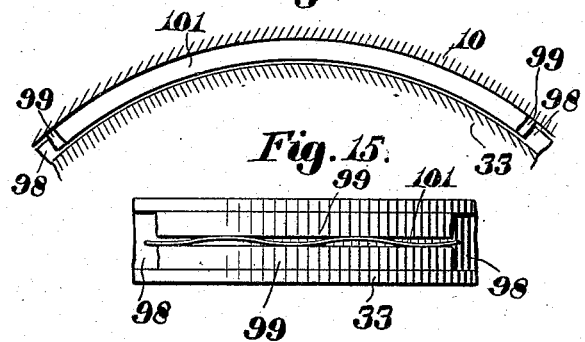
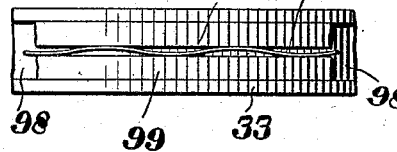
Witnesses:
Nathan C. Lombard
Howard Hanscom
Inventor:
Justus R. Kinney,
by Walter E. Lombard,
Atty.

UNITED STATES PATENT OFFICE.

JUSTUS R. KINNEY, OF DORCHESTER, MASSACHUSETTS.

ROTARY MOTOR AND PUMP.

942,080. Specification of Letters Patent. Patented Dec. 7, 1909.

Application filed November 5, 1907. Serial No. 400,768.

*To all whom it may concern:*

Be it known that I, JUSTUS R. KINNEY, a citizen of the United States of America, and a resident of Dorchester, in the county of Suffolk and State of Massachusetts, have invented certain new and useful Improvements in Rotary Motors and Pumps, of which the following is a specification.

This invention relates to rotary motors and pumps and has for one of its objects the production of a device of this class which is provided with a cylindrical chamber in which is eccentrically mounted a rotary piston one point in the periphery of which is provided with a spring-pressed plate adapted to contact continuously with the cylindrical wall of said chamber.

It has for a further object the provision of means for reducing the frictional contact between the walls of said chamber and said revoluble disks or plates.

It has for a further object the production of a pocket in which said pivoted blade is adapted to operate, and through which the exhaust from said chamber may pass or through which the motive agent may be admitted to said chamber.

It has for a further object the provision of means whereby the inlet valves may be readily operated to reverse the operation of the device while simultaneously operating the valves which control the exhaust from said chamber, closing one of said valves while opening the other.

It has for a further object the production of a suitable tubular throttling valve which is balanced and which is provided with means for moving the same longitudinally of the inlet valve in which it is mounted.

It has for a further object the production of suitable mechanism for controlling the operation of the device, reducing the friction of the movable parts to a minimum, and making a device suitable to be used for the purposes indicated which will be simple in construction and effective in its operation.

The invention consists in certain novel features of construction and arrangement of parts which will be readily understood by reference to the description of the drawings and to the claims hereinafter given.

Figure 2:
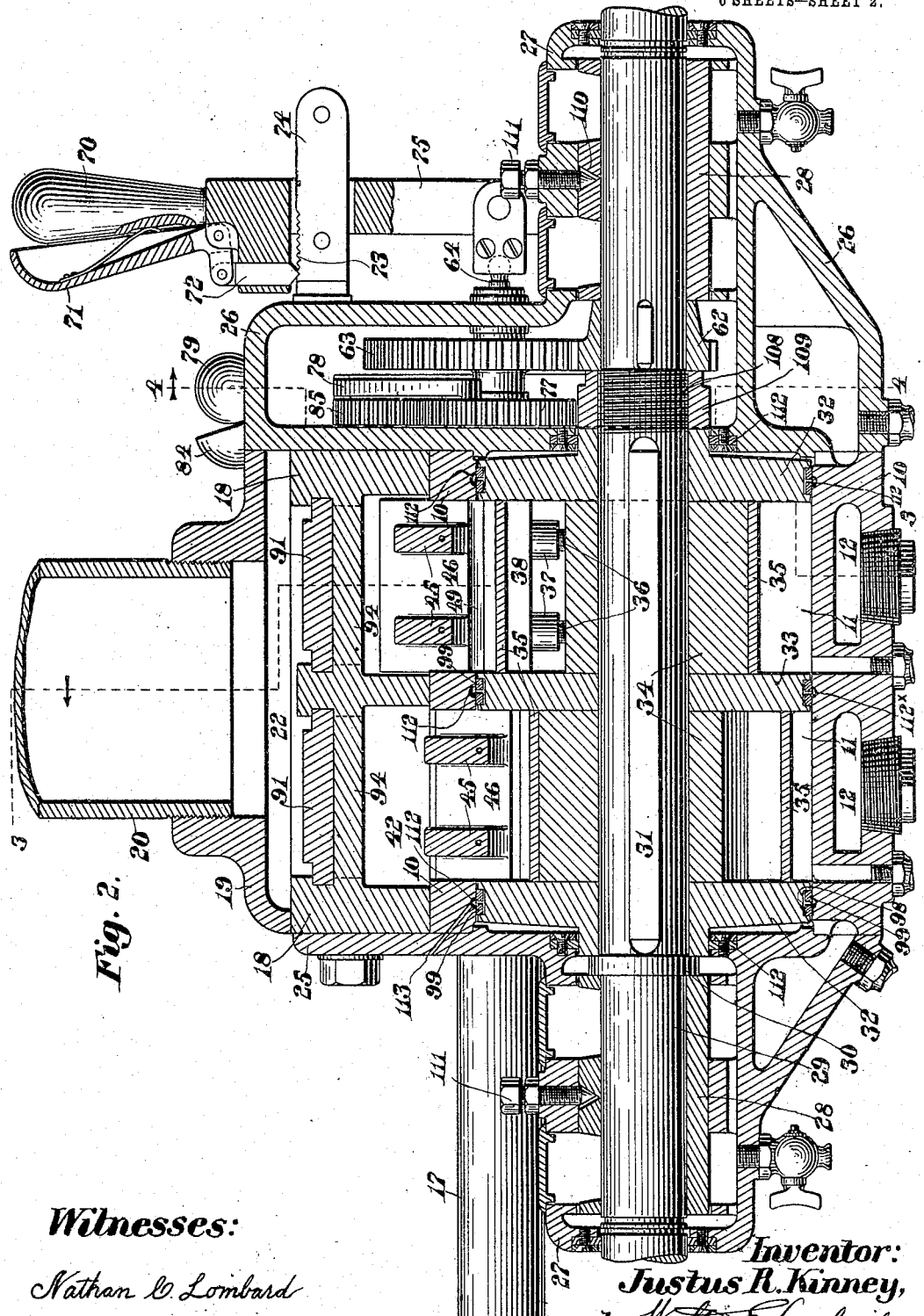

Of the drawings: Figure 1 represents an end elevation of a device embodying the features of this invention. Fig. 2 represents a longitudinal vertical section of the same, the cutting plane being on line 2—2 on Fig. 1. Fig. 3 represents a vertical section of the same, the cutting plane being on line 3—3 on Fig. 2. Fig. 4 represents a transverse vertical section through the gear casing, the cutting plane being on line 4—4 on Fig. 2. Fig. 5 represents a section through the inlet and throttling valves and the mechanism for controlling the operation thereof, the cutting planes being on line 5—5 on Fig. 4. Fig. 6 represents a transverse section through the inlet and throttling valves, the cutting plane being on line 6—6 on Fig. 5. Fig. 7 represents a similar section through the inlet and throttling valves, the cutting plane being on line 7—7 on Fig. 5. Fig. 8 represents a section through the mechanism for operating the pivoted blades, the cutting plane being on line 8—8 on Fig. 3. Fig. 9 represents a portion of the casing cut in section to show the two passages through which the motive agent is adapted to be admitted to the piston chamber and showing the devices coöperating with the pivoted blade to prevent leakage by the same. Fig. 10 represents a section of the same, the cutting plane being on line 10—10 on Fig. 9. Fig. 11 represents an elevation of a device for packing the sides of the pivoted blade. Fig. 12 represents a perspective view of the spring of the device adapted to force the same into contact with the side wall of the blade. Fig. 13 represents a section through the casing and showing the devices for operating the upper exhaust valves, the section being on line 13—13 on Fig. 3. Fig. 14 represents a detail of the devices for preventing leakage between the revoluble disks and the cylindrical wall of the piston chamber. Fig. 15 represents a detail of a portion of one of said revoluble disks showing the packing device therein. Fig. 16 represents a plan of a portion of the piston showing the revoluble plates on either side thereof in section and showing the spring plate attached to the periphery of said piston. Fig. 17 represents a perspective view of said spring plate, and Fig. 18 represents a perspective view of one of the springs for forcing the center thereof outwardly.

Similar characters designate like parts throughout the several figures of the drawings.

In the drawings, 10 represents a suitable casing which is provided with the cylindrical chamber 11 between which and the outer wall of said casing is a suitable steam jacket 12. The chamber 11 is provided with two passages therefrom, as indicated at 13 and 14, Figs. 3 and 9. In the casing 10 at one side of the chamber 11 is a cylindrical passage 15, extending through said casing from end to end, and in which is mounted a tubular inlet valve 16 through which the motive agent is adapted to pass from the inlet pipe 17. Superimposed, upon the main portion 10 of the casing is an intermediate portion 18 of said casing which in turn is covered by the top plate 19 from which extends the exhaust pipe 20. On that side of the casing 10 which is provided with the outlet 14 is secured a side plate 21 which coöperates with the intermediate portion 18 and the top plate 19 of said casing to form a compartment 22 through which the exhaust from the chamber 11 is free to pass. This plate 21 is provided with a foot 23 and the main portion of the casing 10 is provided with a foot 24, on which feet the device is adapted to be supported. To one end of the casing is secured the end plate 25 and to the opposite end, the end plate 26, each of which is provided with an extension 27 in which is mounted a bearing 28 for a revoluble shaft 29 extending through the interior of the cylindrical chamber 11. The shaft 29 is provided with a shouldered flange 30 and has fitted in a suitable key-way therein a key 31 which is adapted to lock upon said shaft 29 the cylindrical disks 32 and intermediate disk 33 to cause the same to revolve with said shaft 29. Between the intermediate disk 33 and each of the end disks or plates 32 are eccentric pistons which pistons are located about said shaft at equal distances from each other. While only two of such pistons are shown in the drawings it is obvious that a greater number may be used without altering the principles of the invention. Each piston consists of a segment 34 secured to the shaft by means of the key 31, a portion of said segment being cylindrical and adapted to fit the interior wall of the cylindrical band 35. That part of the band which is farthest from the axis of the shaft 29 is adapted to be adjusted toward and from said axis by means of the threaded members 36, the threaded portions of which are screwed into sockets in the segment 34 and are provided with enlargements 37 intermediate the ends thereof, the outer walls of which engage with bars 38 bearing against the inner wall of said peripheral band and extending from one side thereof to the other. The outer ends of the threaded members 36 are slotted as at 39 to provide a means of adjusting these members through openings through said peripheral band 35.

In a suitable bearing located partly in the casing 10 and partly in the intermediate portion 18 is a shaft 40 upon which is pivoted a blade 41 adapted to move about the axis of said shaft 40, in a pocket 42 formed in the casing members 10 and 18. The motive agent is prevented from passing from the pocket 42 into the small chamber 43 by means of the wall member 44 forming a part of said pivoted blade 41. This wall member is connected by the arms 45 to the working end 46 of said pivoted blade the arms 45 being separated sufficiently to provide suitable openings through which the motive agent is free to pass from one side of said blade to the other. The working end 46 of the blade 41 is provided with a slidable member 47 pressed outwardly by means of a spring 48 the outer end of said member 47 being provided with a suitable cylindrical end portion to which is pivoted the shoe 49, that portion thereof extending toward the inlet valve 16 being of shorter length than the portion extending in the opposite direction. The object of this difference in length of the shoe 49 on either side of its pivot is to balance the same, that portion which is acted upon by the exhaust being of greater length owing to the decreased effectiveness of the exhaust over the motive agent when first admitted to the chamber 11. The outer face 50 of the working end 46 is concentric with the axis of the shaft 40 and against this face a spring-pressed plate 51 bears to prevent the motive agent in the chamber 11 escaping by the end of said pivoted blade. In the same manner in depressions 52 in the walls of said pocket 42 is mounted a U-shaped member 53 to the rear of which is secured a spring 54 which forces the member 53 outwardly into firm contact with the side walls of said working portion 46 of the blade 41. The blade 41 has arms 55 radiating from said pivotal shaft 40 to which is secured the threaded member 56 on which is adjustable lengthwise of said threaded shank the bearing 57 through which bearing 57 extends the eccentric portion 58 of the shaft 59, to one end of which is keyed a revoluble gear 60. This gear 60 meshes with an intermediate gear 61 which in turn is in mesh with a gear 62 keyed to the piston shaft 29. It is obvious therefore that as the piston revolves the eccentric shaft 59 revolves in unison therewith and the eccentric portions 58 thereof are so located about the axis of said shaft 59 as to always maintain the shoe 49 in contact with the periphery of the piston band 35 in whatever position it may be. The threads upon the threaded member or shank 56 are of slight pitch and by making a half turn of the bearing 57 it is obvious the link connection between the eccentrics 58 and the arms 55 may be shortened or lengthened as desired to regulate the action of the shoe 49 upon the periphery of the piston band 35.

The intermediate or idler gear 61 meshes with the gear 63 which is splined to the shaft 64 rigidly secured to a spider 65 mounted in the end of a tubular throttling valve 66, nicely fitting the interior of the inlet valve 16. This throttling valve is provided with a plurality of triangular ports 67 so disposed as to communicate at the proper time with the ports 68 in the inlet valve 16 to admit the motive agent through the passages 69 communicating directly with the cylindrical chamber 11. In the position shown in the general views of the drawings the throttling valve is in closed position and any rotation thereof would operate without connecting with the ports 68 to admit the motive agent to the chamber 11. As soon as the operator, however, desires to start the engine he grasps the handle 70, operating at the same time the spring-pressed locking device 71 to disengage the bolt 72 from the detents 73 in the arm 74 secured to the end plate 26. In this manner he moves the lever 75 of which the handle 70 forms a part about its pivot 76, thus moving the throttling valve 66 longitudinally of the inlet valve 16 and bringing the ports 67 into register with the ports 68 so that a revolution of the throttling valve 66 will uncover the ports 68 and permit the motive agent passing into the inlet valve 16 to pass into the chamber 11, the amount thereof being regulated by the amount of movement of the valve 66 longitudinally of the valve 16.
The end of the inlet valve 16 opposite the inlet pipe 17 is secured to the hub of a gear 77 which has secured thereto an arm 78, the handle 79 of which may be operated to oscillate the inlet valve 16 so that the ports 68 therein will be moved from communication with the passages 69 to the chamber 11 into position to communicate with the indirect passage 80 through which the motive agent may pass to the pocket 42, and through the blade 45 to the opposite side of the shoe 49 which acts as an abutment, thereby moving the piston in the opposite direction and effecting a reversal of the operation of the device. The end plate 26 is provided with two suitable detent notches 81 and 82 (shown in full in Fig. 1 and in dotted lines in Fig. 4, the cutting plane in the latter figure being between these detent notches 81 and 82 and the lever 78) with either of which the projecting lug 83 on the spring-pressed member 84 is adapted to engage to lock the arm 78 in adjusted position. As shown in the drawings the arm 78 is shown in a position to admit the motive agent through the port 68 and passage 69 to move the piston in the direction of the arrow "a" on Fig. 3. When the arm 78 is moved into a position for the lug 83 to engage the detent notch 82 the port 68 is opposite the passage 80 thereby permitting the motive agent to pass on the opposite side of the shoe 49 and move the piston in the opposite direction. The gear 77 meshes with two gears 85 and 86 the former of which is secured to the crank shaft 87 while the latter is secured to the crank shaft 88. (See Figs. 3 and 4.) The crank portion 89 of the crank shaft 87 engages with a slot 90 in the slidable valve 91 having ports 92 therein coöperating with ports 93 in the wall 94 of the pocket 42. These ports 92 and 93 when in the relative position shown in Fig. 3, permit the exhaust from the chamber 11 to pass freely through the openings in the pivoted blade 41 and through said ports into the exhaust pipe 20. It is obvious that owing to the gear mechanism 77 and 85 between the inlet valve 16 and the crank shaft 87 that any movement of the inlet valve 16 about its axis to move the port 68 into a position to coöperate with the passage 80 will cause a movement of the slide valve 91 to close the ports 93 and prevent the exhaust from the chamber 11 and pocket 42 from passing into the exhaust pipe 20. When the valve 91 has been thus operated to close the exhaust in the pipe 20 and the inlet valve 16 has been moved into a position to permit the motive agent to enter the pocket 42 and pass therefrom into the chamber 11 and the piston is thereby moved in a direction opposite to that indicated by the arrow "a" on Fig. 3, provision must be made to exhaust from the opposite side of said piston as it rotates in said chamber 11. This is accomplished by means of the slidable valve 95 having a slot 96 at right angles to its line of movement, with which the crank portion 97 of the crank shaft 88 co-acts to effect a movement of said valve when the crank shaft 88 is moved about its axis. This movement of the crank shaft 88 is effected by the gear mechanism 86 and 77 between the inlet valve 16 and said crank shaft 88. It is evident therefore that one movement of the lever 78 from the position shown in Fig. 4 to a position in which the lug 83 will engage with the detent notch 82 will effect an oscillation of the inlet valve to shut off the admission of the motive agent to the inlet chamber 11 through the ports 69 and cause it to pass through the passage 80 into the pocket 42, while at the same time this movement of the inlet valve 16 is taking place the valve 91 is being operated to close the ports 93 and simultaneously the valve 95 is being opened to permit the exhaust from the opposite side of said piston to pass through the compartment 22 to the exhaust pipe 20. The movement of the lever 78 in the opposite direction will effect a reversal of the operations of all of these valves 16, 91, and 95.

As will be seen by Fig. 2 the end disks 32 are out of contact with the end plates 25 and

26 of the casing so that as the disks revolve with the shaft 29 there is no frictional contact between these members. In like manner the peripheries of the end disks 32 and the intermediate disk 33 are removed from contact with the inner peripheral wall of the casing member.

The peripheries of each of the disks or plates 32 and 33 are provided with a groove 98 in which is mounted a pair of rings 99 prevented from rotation by means of the locking pins 100 and separated from each other by means of suitable springs 101 which separate the rings 99 and force their outer faces into contact with the groove 98 in the periphery of said disks or plates 32 and 33. By means of these spring-pressed rings operating as they do in the groove 98 the disks or plates 32 and 33 are packed in such manner to effectually prevent the motive agent from escaping from the cylindrical chambers 11 or from one chamber to another. While this construction secures an effectual packing it at the same time reduces the friction between the disks and the fixed rings upon which they revolve. A pipe 102 communicates with the steam jacket 12 to admit a motive agent of a suitable temperature so that that portion of the cylindrical chamber 11 surrounded thereby is maintained at comparatively the same temperature as that part of the chamber adjacent to the compartment 22 which is filled with the exhaust from said chamber.

The peripheral band 35 is provided, at the point farthest from the axis of the revoluble shaft 29, with a depression 103 in which is mounted a curved spring plate 104 having suitable slots 105 at either end through which extend screws 106 by which said plate 104 is secured to the periphery of said annular band 35. Owing to the elongated slots 105 the transverse edges of the plate 104 may be moved slightly along the periphery of the band 35 to permit the central portion thereof being forced outwardly so as to always contact with the inner wall of the cylindrical chamber 11, this outward movement of the central portion of the plate 104 being secured by means of a plurality of springs 107 secured to said peripheral band 35 in said depression 103 as clearly disclosed in Figs. 3, 16, 17, and 18. This construction insures a continuous engagement between the rotary piston and the inner wall of the chamber 11 throughout the complete revolution of said piston.

One portion of the shaft 29 is threaded as indicated at 108 and upon this threaded portion is a nut 109 forming a suitable adjustable shoulder between which and the shoulder flange 30 the revoluble plates or disks 32 and 33 and the pistons 34 and 35 are securely clamped. The bearings 28 for the shaft 29 are each provided with conical depressions 110 against the inclined walls of which the tapered ends of the bolts 111 co-act to force the bearings toward each other so that the revoluble plates or disks 32 and 33 and the pistons 34—35 may be centered between the end plates 25 and 26 to prevent frictional contact therewith. Each of the outer revoluble disks 32 is provided with a hub extending through an opening in one of the end plates 25 and 26 which plate is provided with an annular packing 112 which bears against the periphery of this hub to prevent any material from passing through the opening in either direction.

In order to lubricate the revoluble disks 32 and 33 the casing member 10 is provided with an annular groove 112*; opposite the peripheries of these disks connected by means of a passage 113 to the exterior of the casing through which a lubricant may be forced into the groove 112* which will pass between the rings 99 and thoroughly lubricate the side walls of the groove 98 as the disks 32 and 33 revolve upon said rings 99. In a like manner in order to lubricate the interior parts of the device the shaft 40 is made tubular with a passage 114 through the same into which a suitable lubricant may be forced, this lubricant passing through the radial passage 115 to the shallow groove 116 on the cylindrical face of the wall member 44 thereby lubricating the cylindrical surface of said wall member and reducing the friction at this point to a minimum. The passage 114 also has communicating therewith through each of the arms 45 a passage 117 which communicates with an opening 119 extending transversely through the slidable member 47, thereby lubricating the sides of said slidable member. From the opening 118 extends a passage 119 to the inner end of said slidable member and through the shoe 49 communicating with the shallow groove 120 in the working face of said shoe, thereby lubricating the surface of said shoe contacting with the periphery of the rotary piston. It will thus be seen that provision is made whereby a suitable lubricant may be forced through suitable passages to lubricate from the exterior of the device all of the working parts of the mechanism within the casing.

In the operation of the apparatus the motive fluid is admitted through the pipe 17 to the interior of the tubular throttling valve 66 from which the fluid passes through the ports 67 and thence through the ports 68 in the inlet valve 16 and the ports 69 in the casing 10 to that portion of the cylindrical chamber 11 between the eccentric piston 35 and the pivoted blade 41. This admission of the fluid into this space causes the piston to be rotated in the direction of the arrow "a" on Fig. 3, as has been heretofore described. As the piston continues to rotate the motive fluid will pass outwardly through the passage 13 and through the ports 93 and 92 into the exhaust pipe 20. When it is desired to reverse the motor the motive fluid will pass from the inlet valve through the passage 80 and as the valve 91 is closed at this time, the motive fluid will pass through the pivoted blade 41 into the chamber and move the piston in a direction opposite to that indicated by the arrow "a" on Fig. 3, this motive fluid passing from the chamber 11 through the exhaust passage 14, the valve 95 being open at this time. As the fluid passes through the passage 14, it passes upwardly through the compartment 22 into the exhaust pipe 20.

It is believed that from the foregoing the operation and the many advantages of a device of this class, constructed as herein described, will be fully apparent without further description.

Having thus described my invention, I claim:

1. In a device of the class described, the combination of a casing having a cylindrical chamber; a rotary piston therein composed of a segment of a cylinder; a continuous cylindrical band thereon; a member threaded to said segment provided with an enlarged portion intermediate its ends; a bar in contact with said enlarged portion extending transversely of the inner circumferential wall of said band provided with an opening therethrough for the reception of the outer end of said threaded member; and means for moving said threaded member.

2. In a device of the class described, the combination of a casing having a cylindrical chamber; a rotary piston therein composed of a segment of a cylinder; a continuous cylindrical band thereon; a plurality of members threaded to said segment each provided with an enlarged portion intermediate its ends; a bar in contact with said enlarged portion extending transversely of said band provided with a plurality of openings therethrough for the reception of the outer ends of said threaded members; and means on the outer ends of said threaded members by which they may be adjusted.

3. In a device of the class described, the combination of a casing having a cylindrical chamber; a rotary piston therein; a pivoted blade adapted to bear upon the periphery of said piston and provided with openings therethrough intermediate the piston contacting portion and the pivot thereof; an inlet valve; and means for operating said valve to admit a motive agent directly into said chamber at one side of said piston contacting portion of said pivoted blade or indirectly through said openings at the opposite side of the blade.

4. In a device of the class described, the combination of a casing having a cylindrical chamber; a rotary piston therein; a pivoted blade adapted to bear upon the periphery of said piston and provided with openings therethrough intermediate the piston contacting portion and the pivot thereof; an inlet valve; means for operating said valve to admit a motive agent directly into said chamber at one side of said piston contacting portion or indirectly through said openings at the opposite side of said blade; two exhaust ports communicating with said chamber; and a valve for each.

5. In a device of the class described, the combination of a casing having a cylindrical chamber; a rotary piston therein; a pivoted blade adapted to bear upon the periphery of said piston and provided with openings therethrough intermediate the piston contacting portion and the pivot thereof; an inlet valve; means for operating said valve to admit a motive agent directly into said chamber at one side of said piston contacting portion or indirectly through said openings at the opposite side of said blade; two exhaust ports communicating with said chamber; a valve for each; and means for simultaneously opening one valve and closing the other.

6. In a device of the class described, the combination of a casing having a cylindrical chamber; a rotary piston therein; a pivoted blade adapted to bear upon the periphery of said piston and provided with openings therethrough intermediate the piston contacting portion and the pivot thereof; an inlet valve; means for operating said valve to admit a motive agent directly into said chamber at one side of said piston contacting portion or indirectly through said openings at the opposite side of the blade; two exhaust ports communicating with said chamber; a valve for each; and means for simultaneously operating the inlet valve and each of the exhaust valves to effect a reversal of the operation.

7. In a device of the class described, the combination of a casing having a cylindrical chamber provided with an inlet port; a rotary piston therein; a pivoted blade adapted to bear upon the periphery of said piston and provided with openings therethrough intermediate the piston contacting portion and the pivot thereof; a passage communicating with the openings through said blade; a tubular inlet valve provided with an outlet port; and means for oscillating said inlet valve to cause said outlet port to register with either the inlet port to said chamber or the indirect passage thereto.

8. In a device of the class described, the combination of a casing having a cylindrical chamber provided with an inlet port; a rotary piston therein; a pivoted blade adapted to bear upon the periphery of said piston and provided with openings therethrough intermediate the piston contacting portion and the pivot thereof; a passage communicating with said openings; an inlet valve having an outlet port; means for oscillating said inlet valve to cause said outlet port to register with either the inlet port to said chamber or the indirect passage thereto; and a revoluble tubular throttling valve within said inlet valve provided with a plurality of ports adapted to communicate with the ports of said inlet valve during its rotation.

9. In a device of the class described, the combination of a casing having a cylindrical chamber provided with an inlet port; a rotary piston therein; a pivoted blade adapted to bear upon the periphery of said piston and provided with openings therethrough intermediate the piston contacting portion and the pivot thereof; a passage communicating with said openings; an inlet valve having an outlet port; means for oscillating said inlet valve to cause said outlet port to register with either the inlet port to said chamber or the indirect passage thereto; a revoluble tubular throttling valve within said inlet valve provided with a plurality of ports adapted to communicate with the ports of said inlet valve during its rotation; and means for moving said throttling valve longitudinally of said inlet valve.

10. In a device of the class described, the combination of a casing having a cylindrical chamber provided with an inlet port; a rotary piston therein; a pivoted blade adapted to bear upon the periphery of said piston and provided with openings therethrough intermediate the piston contacting portion and the pivot thereof; a passage communicating with said openings; a tubular inlet valve adapted to be oscillated and having an outlet port; means for oscillating said inlet valve to cause said outlet port to register with either the inlet port to said chamber or the indirect passage thereto; a revoluble tubular throttling valve within said inlet valve provided with a plurality of ports adapted to communicate with the ports of said inlet valve during its rotation; and a lever for moving said throttling valve longitudinally of said inlet valve.

11. In a device of the class described, the combination of a casing having a cylindrical chamber provided with an inlet port; a rotary piston therein; a pivoted blade adapted to bear upon the periphery of said piston and provided with openings therethrough intermediate the piston contacting portion and the pivot thereof; a passage communicating with said openings; a tubular inlet valve adapted to be oscillated and having an outlet port; means for oscillating said inlet valve to cause said outlet port to register with either the inlet port to said chamber or the indirect passage thereto; a revoluble tubular throttling valve within said inlet valve provided with a plurality of ports adapted to communicate with the ports of said inlet valve during its rotation; a lever for moving said throttling valve longitudinally of said inlet valve; and means for locking said lever in adjusted position.

12. In a device of the class described, the combination of a casing having a cylindrical chamber; a rotary piston therein; a pivoted blade adapted to bear upon the periphery of said piston and provided with openings therethrough intermediate the piston contacting portion and the pivot thereof; an inlet valve; a cylindrical inlet passage provided with two series of ports communicating with said chamber; a tubular throttling valve therein provided with a plurality of ports adapted to coact with each series of ports from said passage; a gear secured to said throttling valve; and a gear revoluble with said piston meshing with and operating said valve gear.

13. In a device of the class described, the combination of a casing having a cylindrical chamber; a rotary piston therein; a pivoted blade adapted to bear upon the periphery of said piston and provided with openings therethrough intermediate the piston contacting portion and the pivot thereof; a cylindrical inlet passage provided with two series of ports communicating with said chamber; a tubular throttling valve therein provided with a plurality of ports adapted to coact with each series of ports from said passage; a shaft secured to the end of said throttling valve and provided with a keyway; a revoluble gear keyed thereto; and means for moving said valve longitudinally.

14. In a device of the class described, the combination of a casing having a cylindrical chamber; a rotary piston therein; a pivoted blade adapted to bear upon the periphery of said piston and provided with openings therethrough intermediate the piston contacting portion and the pivot thereof; a cylindrical inlet passage provided with two series of ports communicating with said chamber; a tubular throttling valve therein provided with a plurality of ports adapted to coact with each series of ports from said passage; a shaft secured to the end of said throttling valve and provided with a keyway; a revoluble gear keyed thereto; and a lever for moving said valve longitudinally.

15. In a device of the class described, the combination of a casing having a cylindrical chamber; a rotary piston therein; a pivoted blade adapted to bear upon the periphery of said piston and provided with openings therethrough intermediate the piston contacting portion and the pivot thereof; a cylindrical inlet passage provided with two series of ports communicating with said chamber; a tubular throttling valve therein provided with a plurality of ports adapted to coact with each series of ports from said passage; a shaft secured to the end of said throttling valve and provided with a keyway; a revoluble gear keyed thereto; a lever for moving said valve longitudinally; and means for locking said lever in adjusted position.

16. In a device of the class described, the combination of a casing having a cylindrical chamber; a rotary piston therein; a pivoted blade adapted to bear upon the periphery of said piston and provided with openings therethrough intermediate the piston contacting portion and the pivot thereof; a cylindrical inlet passage provided with two series of ports communicating with said chamber; a tubular throttling valve therein provided with a plurality of ports adapted to coact with each series of ports from said passage; a spider secured to the end of said throttling valve; a shaft secured thereto; and means for revolving said valve mounted on said shaft.

17. In a device of the class described, the combination of a casing having a cylindrical chamber; a rotary piston therein; a pivoted blade adapted to bear upon the periphery of said piston and provided with openings therethrough intermediate the piston contacting portion and the pivot thereof; a tubular inlet valve provided with two series of ports communicating with said chamber; a gear on said inlet valve; an exhaust valve; and a gear meshing with said valve gear for operating said exhaust valve.

18. In a device of the class described, the combination of a casing having a cylindrical chamber; a rotary piston therein; a pivoted blade adapted to bear upon the periphery of said piston and provided with openings therethrough intermediate the piston contacting portion and the pivot thereof; a tubular inlet valve provided with two series of ports communicating with said chamber; a gear on said inlet valve; two exhaust valves; a gear for each valve meshing with said valve gear; and a lever secured to said valve gear for simultaneously operating all of said valves.

19. In a device of the class described, the combination of a casing having a cylindrical chamber; a rotary piston therein; a pivoted blade adapted to bear upon the periphery of said piston and provided with openings therethrough intermediate the piston contacting portion and the pivot thereof; a tubular inlet valve provided with two series of ports communicating with said chamber; a gear on said inlet valve; two exhaust valves; a gear on each valve meshing with said valve gear; a lever secured to said valve gear for simultaneously operating all of said valves; and means for locking said lever in adjusted position.

20. In a device of the class described, the combination of a casing having a cylindrical chamber; a rotary piston therein; a pivoted blade adapted to bear upon the periphery of said piston and provided with openings therethrough intermediate the piston contacting portion and the pivot thereof; an inlet valve; an exhaust valve tangential to said chamber provided with a slot at right angles to its direction of movement; and a crank coacting with said slot to operate said valve.

21. In a device of the class described, the combination of a casing having a cylindrical chamber; a rotary piston therein; a pivoted blade adapted to bear upon the periphery of said piston and provided with openings therethrough intermediate the piston contacting portion and the pivot thereof; an inlet valve; two exhaust valves each provided with a slot at right angles to the direction of movement of its valve; a crank coacting with each slot; and mechanism for operating said cranks for simultaneously opening one valve while closing the other.

22. In a device of the class described, the combination of a casing having a cylindrical chamber; a rotary eccentric piston therein; a pivoted blade coacting therewith; a revoluble eccentric the axis of which is removed from but parallel to the axis of said piston; mechanism between said piston and eccentric whereby both revolve in unison; and a link between said eccentric and said pivoted blade.

23. In a device of the class described, the combination of a casing having a cylindrical chamber; a rotary eccentric piston therein; a pivoted blade coacting therewith provided with a secondary arm integral therewith; a revoluble eccentric the axis of which is removed from but parallel to the axis of said piston; mechanism between said piston and eccentric whereby both revolve in unison; and a link between said eccentric and said secondary arm.

24. In a device of the class described, the combination of a casing having a cylindrical chamber; a rotary eccentric piston therein; a pivoted blade coacting therewith provided with a secondary arm integral therewith; a revoluble eccentric the axis of which is removed from but parallel to the axis of said piston; mechanism between said piston and eccentric whereby both revolve in unison; a link between said eccentric and said secondary arm; and means for adjusting the length of said link.

25. In a device of the class described, the combination of a casing having a cylindrical chamber; a rotary piston therein; a pivoted blade coacting with said piston; a pocket in said casing within which said blade is adapted to operate communicating with said chamber; a compartment at one side of said chamber communicating with said pocket and chamber; an exhaust outlet therefrom; a valve to close each passage between said compartment and said pocket and chamber; an inlet to said chamber; a passage from the inlet to said pocket; and a tubular valve adapted to be oscillated to direct the motive agent into said chamber or said pocket as desired.

26. In a device of the class described, the combination of a casing having a cylindrical chamber; a rotary piston therein; a pivoted blade coacting with said piston; a pocket in said casing within which said blade is adapted to operate communicating with said chamber; a compartment at one side of said chamber communicating with said pocket and chamber; an exhaust outlet therefrom; a valve to close each passage between said compartment and said pocket and chamber; an inlet to said chamber; a passage from the inlet to said pocket; a tubular valve adapted to be oscillated to direct the motive agent into said chamber or said pocket as desired; and a revoluble tubular throttling valve within said oscillating valve.

27. In a device of the class described, the combination of a casing having a cylindrical chamber; a rotary piston therein; a pivoted blade co-acting with said piston having a semi-cylindrical surface fitting a bearing in said casing and provided with shallow grooves extending throughout the length of said bearing surface; and a hollow shaft forming a pivot for said blade and connected with said hollow grooves by suitable inclosed passages.

28. In a device of the class described, the combination of a casing having a cylindrical chamber; a rotary piston therein; a pivoted blade co-acting therewith; a spring-pressed member in a slot in the free end of said pivoted blade and bearing on said piston; and a hollow shaft forming a pivot for said blade and connected by means of a suitable passage to said slot.

29. In a device of the class described, the combination of a casing having a cylindrical chamber; a rotary piston therein; a pivoted blade co-acting therewith; a spring-pressed member in a slot in the free end of said pivoted blade provided with an opening extending therethrough and a passage extending from said opening to the outer end of said member; a hollow shaft forming a pivot for said blade and connected by means of a suitable passage to said slot; and a shoe pivotally connected to the outer end of said member adapted to co-act with said rotary piston.

30. In a device of the class described, the combination of a casing having a cylindrical chamber; a rotary piston therein; a pivoted blade co-acting therewith; a spring-pressed member in a slot in the free end of said pivoted blade provided with an opening extending therethrough and a passage extending from said opening to the outer end of said member; a hollow shaft forming a pivot for said blade and connected by means of a suitable passage to said slot; and a shoe provided with a shallow groove extending lengthwise thereof and communicating by means of a suitable passage to the passage through said spring-pressed member.

31. In a device of the class described, the combination of a casing having a cylindrical chamber; rotary pistons therein; revoluble disk members interposed between said pistons and at the end thereof each provided upon its periphery with a shallow groove adapted to hold packing rings and communicating with a shallow groove in the opposite wall of the casing member; and a passage from said shallow groove to the exterior of the casing through which a suitable lubricant may be inserted.

Signed by me at Boston, Mass., this 2d day of November, 1907.

JUSTUS R. KINNEY.

Witnesses:
F. P. BARTLETT,
WARREN S. HILL.